(12) United States Patent (10) Patent No.: US 7,789,437 B2
Sheng (45) Date of Patent: Sep. 7, 2010

(54) LOCKABLE DOOR ASSEMBLY OF AN ELECTRONIC DEVICE

(75) Inventor: Yen-Long Sheng, Jhonghe (TW)

(73) Assignee: Getac Technology Corporation, Hsinchu (TW)

( * ) Notice: Subject to any disclaimer, the term of this patent is extended or adjusted under 35 U.S.C. 154(b) by 276 days.

(21) Appl. No.: 11/857,112

(22) Filed: Sep. 18, 2007

(65) Prior Publication Data

US 2008/0291641 A1 Nov. 27, 2008

(30) Foreign Application Priority Data

May 25, 2007 (TW) ................ 96118847 A

(51) Int. Cl.
*E05C 1/02* (2006.01)
*E05C 1/04* (2006.01)

(52) U.S. Cl. ............ 292/137; 292/145; 292/146; 292/150; 292/DIG. 11; 292/DIG. 63

(58) Field of Classification Search ............ 292/32, 292/137, DIG. 11, DIG. 48, DIG. 50, DIG. 63, 292/145–147, 150
See application file for complete search history.

(56) References Cited

U.S. PATENT DOCUMENTS

| | | | | |
|---|---|---|---|---|
| 188,134 A | * | 3/1877 | Hill | 70/100 |
| 955,774 A | * | 4/1910 | Drury | 70/129 |
| 1,526,066 A | * | 2/1925 | Hornostaj | 292/150 |
| 1,617,813 A | * | 2/1927 | Judge | 292/150 |
| 1,653,015 A | * | 12/1927 | Koelln | 292/152 |
| 2,162,031 A | * | 6/1939 | Reavill | 292/74 |
| 2,546,149 A | * | 3/1951 | Bowzer | 16/110.1 |
| 2,970,858 A | * | 2/1961 | Norrenberg-Sudhaus | 292/283 |
| 3,186,198 A | * | 6/1965 | Noerrenberg-Sudhaus | 70/74 |
| 3,768,847 A | * | 10/1973 | Buck et al. | 292/179 |
| 4,179,143 A | * | 12/1979 | Shy | 292/179 |
| 4,214,783 A | * | 7/1980 | Boegeman | 292/150 |
| 4,746,152 A | * | 5/1988 | Willcox | 292/150 |
| 4,908,917 A | * | 3/1990 | Kazle | 24/615 |
| 5,751,545 A | * | 5/1998 | Jung | 361/679.58 |
| 6,554,327 B1 | * | 4/2003 | Riley | 292/152 |

FOREIGN PATENT DOCUMENTS

TW I260192 5/1994

* cited by examiner

*Primary Examiner*—Carlos Lugo

(57) ABSTRACT

A lockable door assembly of an electronic device is used to cover and seal an opening of a housing of the electronic device. The lockable door assembly includes a door, a first sliding member, and a second sliding member. The door is pivoted to the housing to cover the opening. The first sliding member is movably disposed on the door for being engaged with a rib formed on the housing, so as to stop the door from rotating. The second sliding member is movably disposed on the door, and the sliding paths of the second sliding member and the first sliding member are intersected. The second sliding member is used for being inserted into a nick of the first sliding member to prevent the first sliding member from moving, thereby a double secure mechanism is achieved and the thickness of the lockable door is reduced.

19 Claims, 11 Drawing Sheets

LOCKABLE DOOR ASSEMBLY OF AN ELECTRONIC DEVICE

BACKGROUND OF THE INVENTION

1. Field of Invention

The present invention relates to a lockable door assembly of a housing, and more particularly to a lockable door assembly that has fine structure durability and provides multi-locking mechanisms.

2. Related Art

With rapid development of computers, laptops or portable computers which are quite convenient to be carried have gradually become the mainstream products in the market instead of desktop computers. However, in the early days, business or home laptops or portable computers have no space for future upgrade like desktop computers in consideration of manufacturing, costs, and so on, so that consumers cannot add some peripheral hardware devices such as hard disk drives and optical disk drives at will. Hence, in order to provide space for future upgrade, laptops or portable computers of certain types that allow users to install or replace hardware devices freely have developed in this industry.

A laptop or portable computer upgradeable has reserved inside the housing for consumers to assemble peripheral device at will, and an opening is formed on the housing for communicating the space. A user can detach or install peripheral devices directly through the opening without disassembling the housing, thereby avoiding malfunctions due to improper disassembling of the housing. On the other hand, a shield, e.g. a lockable door, is required to cover and seal the opening of the housing to prevent dust or other foreign substances from getting into the housing. Furthermore, for the purpose of applying an upgradeable laptop or a portable computer in a tough and severe environment, the lockable door for covering and sealing the opening of the housing must be dustproof and waterproof while not affecting the convenience in use. Therefore, the convenience of use and the shielding in the environment must be taken in account at the same time. For example, Taiwan Patent 1260192 has disclosed a relevant design having the aforementioned functions.

Taiwan Patent 1260192 provides a lockable door assembly for a laptop or a portable computer, which may be securely locked on the housing for covering and sealing the opening, such that the door will not be opened unexpectedly under the tough conditions of vibration and impact in external environment, and meanwhile, the door may be opened conveniently and has dustproof and waterproof functions. However, some project or military rugged mobile computers with a special specification have strict requirements on using environment, the lockable door assembly disclosed in 1260192 is complicated in the case of having large number of parts and cannot be fully adapted to the rugged mobile computers. Furthermore, 1260192 does not provide a solution directed to the problem that the door may be mistakenly opened. Therefore, the lockable door assembly disclosed in 1260192 still needs an improvement on the structure durability and protection.

SUMMARY OF THE INVENTION

The lockable door assembly in the prior art is complicated in the case of having large number of parts, and has no relevant mechanisms to avoid being opened accidentally. The object of the present invention is directed to provide a lockable door assembly that has reduced number of parts and can provide a double secure mechanism having a multi-locking function.

In order to achieve the aforementioned object, a lockable door assembly of the present invention is provided for covering and sealing an opening of a housing of an electronic device, wherein the housing has a rib formed thereon adjacent to the opening. The lockable assembly includes a door, a fixing member, a first sliding member, and at least one second sliding member. The door is pivoted to the housing for covering the opening, and the fixing member is fixed on the door. The first sliding member is movably disposed on the fixing member, and slides between a first position and a second position relative to the door. The first sliding member has a latching portion and at least one nick. The latching portion is engaged with the rib adjacent to the opening at the first position, so as to stop the door from rotating relative to the housing. The second sliding member is movably disposed on the fixing member, and the sliding paths of the second sliding member and the first sliding member are intersected on the same plane. The second sliding member is used for being inserted into the nick of the first sliding member to prevent the first sliding member departing from the first position, such that the latching portion of the first sliding member remains being engaged with the rib, thereby prevent the door from be released from the opening.

The advantages of the present invention lie in that the lockable door assembly has reduced number of parts and a simplified structure, so as to effectively enhancing structure strength and structure durability. And sliding paths of the first sliding member and the second sliding member slide are intersected on the same plane, thus not only reducing the thickness of the lockable door assembly, but also providing a double secure mechanism, thereby preventing the door from being opened due to the first sliding member being accidentally moved.

The detailed features and advantages of the present invention will be described in detail in the following embodiments. Those skilled in the arts can easily understand and implement the content of the present invention. Furthermore, the relative objects and advantages of the present invention are apparent to those skilled in the arts with reference to the content disclosed in the specification, claims, and drawings.

It is to be understood that, both the above description of the content of the present invention and the following detailed description intend to demonstrate and illustrate the principle of the invention, and to provide further explanation of the invention as claimed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
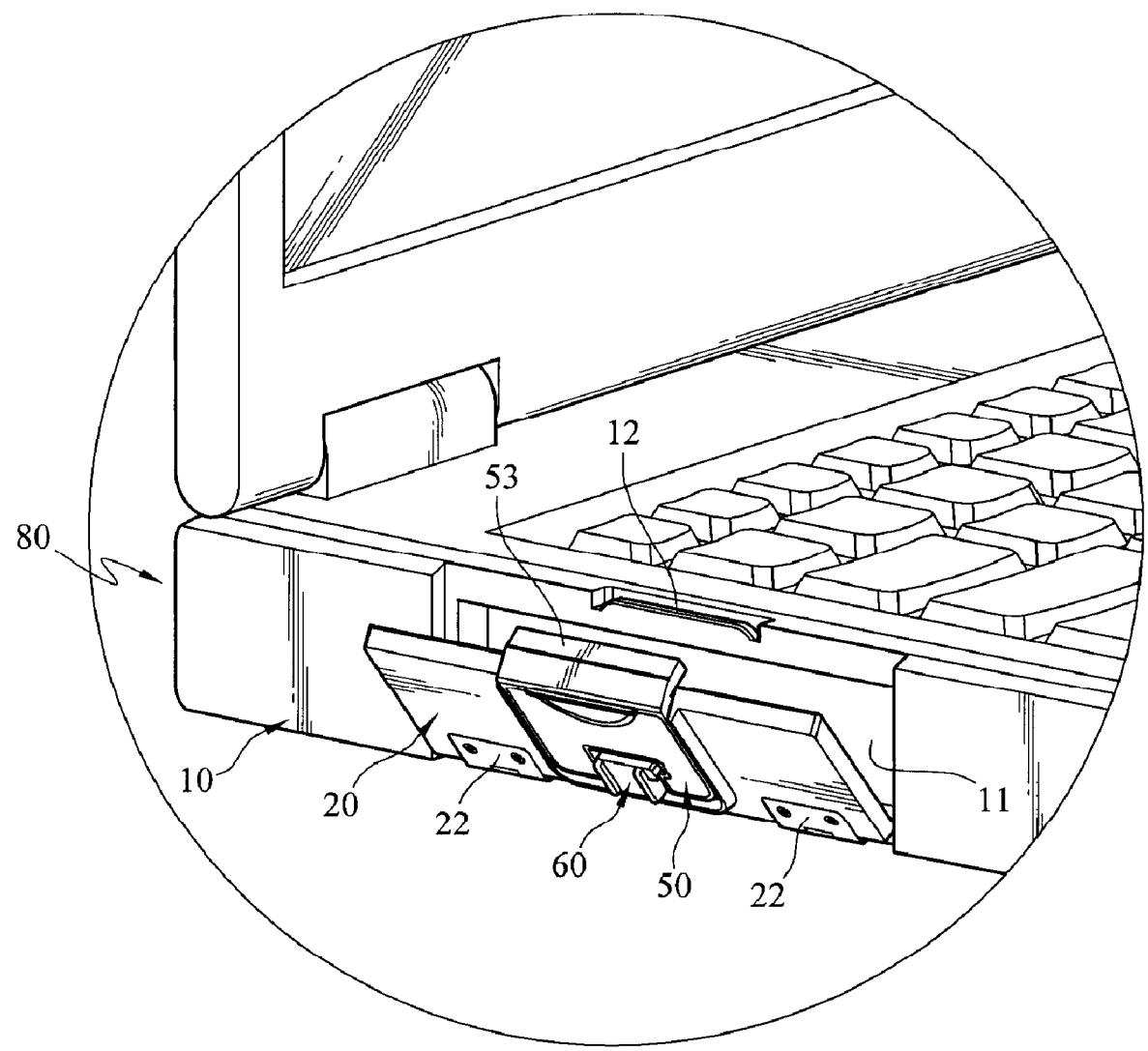
FIG. 1 is a perspective view of a lockable door assembly pivoted to an opening of a housing according to a first embodiment of the present invention.
Figure 2:
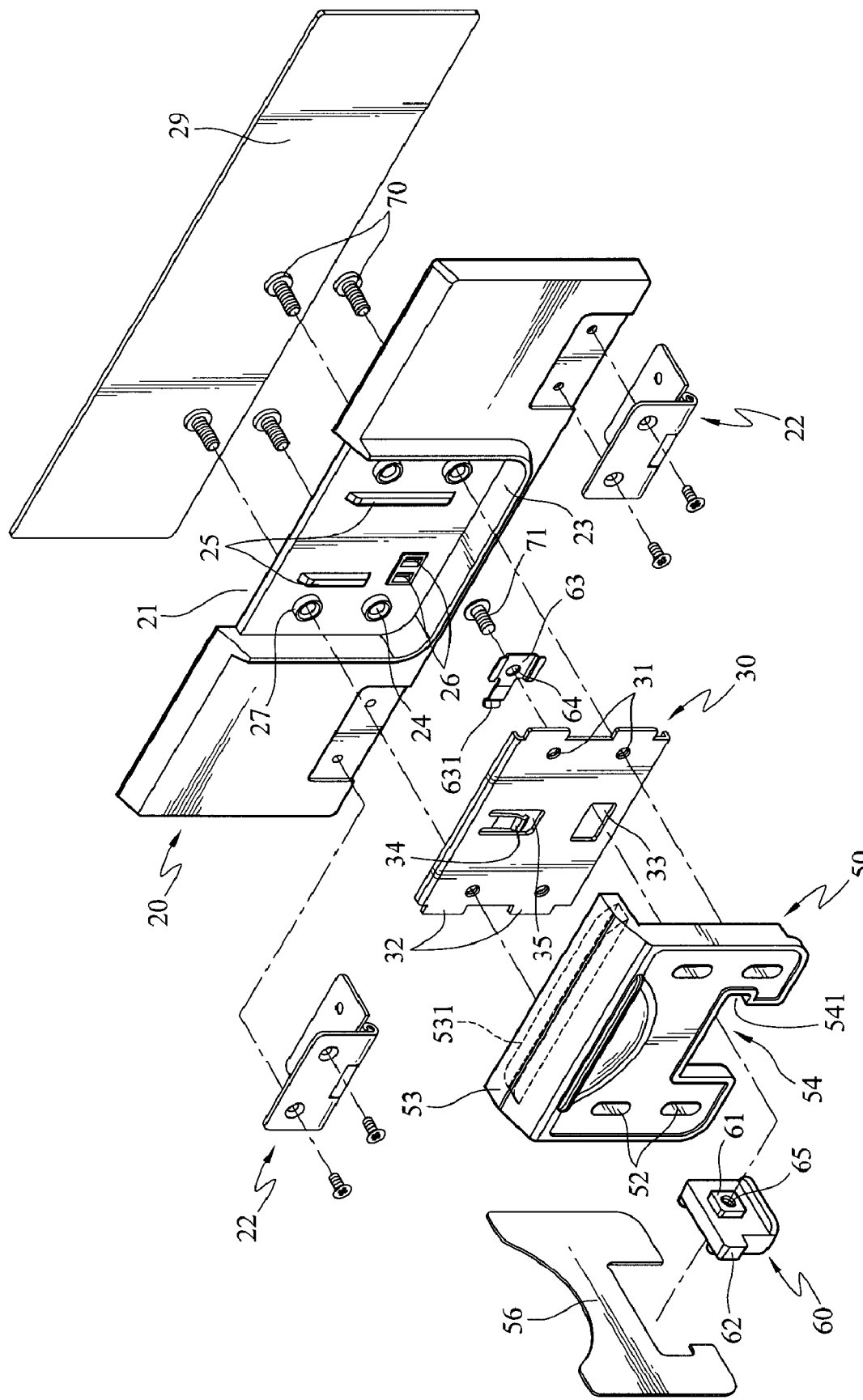
FIG. 2 is an exploded view of a lockable door assembly according to the first embodiment of the present invention.

Referring to FIGS. 1 and 2, a lockable door assembly according to a first embodiment of the present invention is shown. The lockable door assembly is used for covering and sealing an opening 11 of a housing 10, so as to cover the opening 11 tightly or to be opened to allow the opening 11 to provide entrance and exit in use. The housing 10 has a rib 12 formed thereon adjacent to the opening 11. The housing 10 may be a housing of an electronic device 80, such as a housing of a keyboard of a rugged mobile computer, and the opening 11 may be a window for communicating the outside of the housing 10 with the internal expansion space, for example, an expansion slot for replacing a hard disk drive or an optical disk drive. The lockable door assembly in the first embodiment of the present invention includes a door 20, a fixing member 30, a first sliding member 50, and a second sliding member 60.

Figure 3:
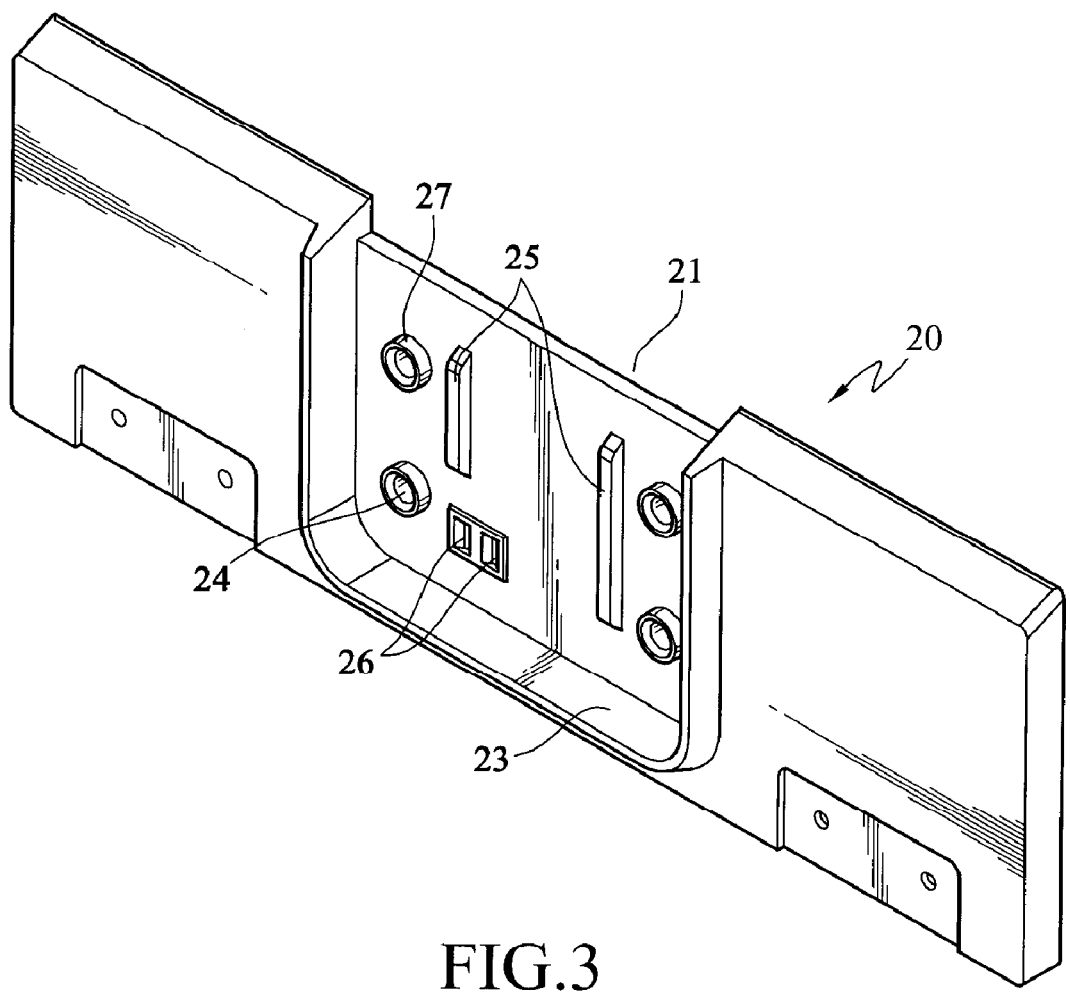
FIG. 3 is a perspective view of the door according to the first embodiment of the present invention.

Referring to FIGS. 2 and 3, the door 20 is substantially rectangular, which has one long edge pivoted to the housing 10 adjacent to an edge of the opening 11, and a gap 21 is defined between another long side of the door 20 and the rib 12. The door 20 is pivoted to the housing 10 by two hinges 22. The door 20 can rotate relative to the housing 10 with respect to one long side thereof for covering and sealing the opening 11. A U-shaped flange 23 is formed at the middle section of the outer side surface of the door 20. The outer side surface of the door 20 is divided into an inner region and an outer region by the U-shaped flange 23. A plurality of fixing holes 24, a plurality of contacting flanges 25, and two positioning holes 26 are formed in the inner region surrounded by the U-shaped flange 23. Each of the fixing holes 24 communicate two side surface of the door 20, and the edge of each of the fixing holes 24 forms a round flange 27. The contacting flanges 25 and the round flanges 27 protrude outward from the outer surface of the door 20 and have the same protruding height, so as to keep a proper spacing between the door 20 and the fixing member 30 for the second sliding member 60 to slide between the fixing member 30 and the door 20. The positioning holes 26 are formed side by side along a transverse axis direction (relative to the door 20) on the surface of the inner region surrounded by the U-shaped flange 23 on the door 20. A waterproof gasket 29 matching the size of the opening 11 is attached on the inner surface of the door 20 for covering the opening 11, so that the door 20 can cover and seal the opening 11 tightly by the waterproof gasket 29 and has the waterproof and dustproof functions. The number of the fixing holes 24 can be changed in consideration of actual designs, and four fixing holes 24 are preferred in the first embodiment of the present invention. The number and configuration of the contacting flanges 25 can be changed in consideration of actual designs, and two strip-shaped contacting flanges 25 are preferred in the first embodiment of the present invention.

Figure 4:
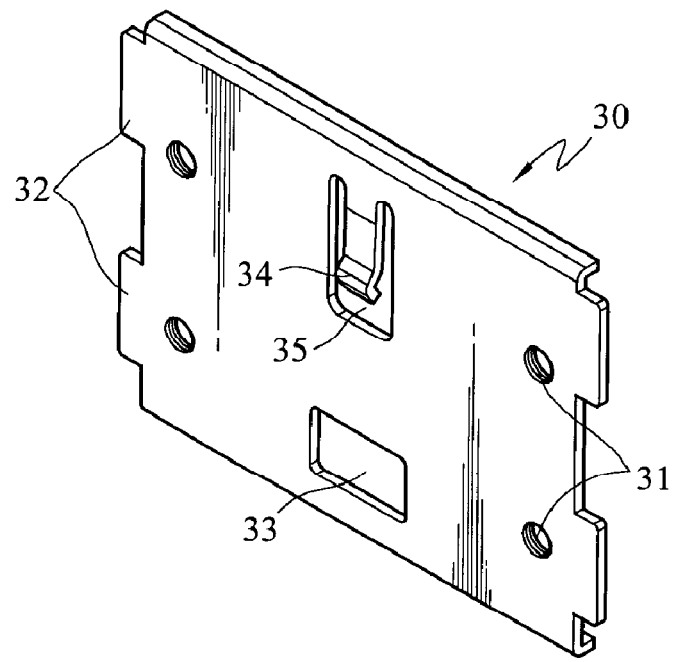
FIG. 4 is a perspective view of a fixing member according to the first embodiment of the present invention.
Figure 5A:
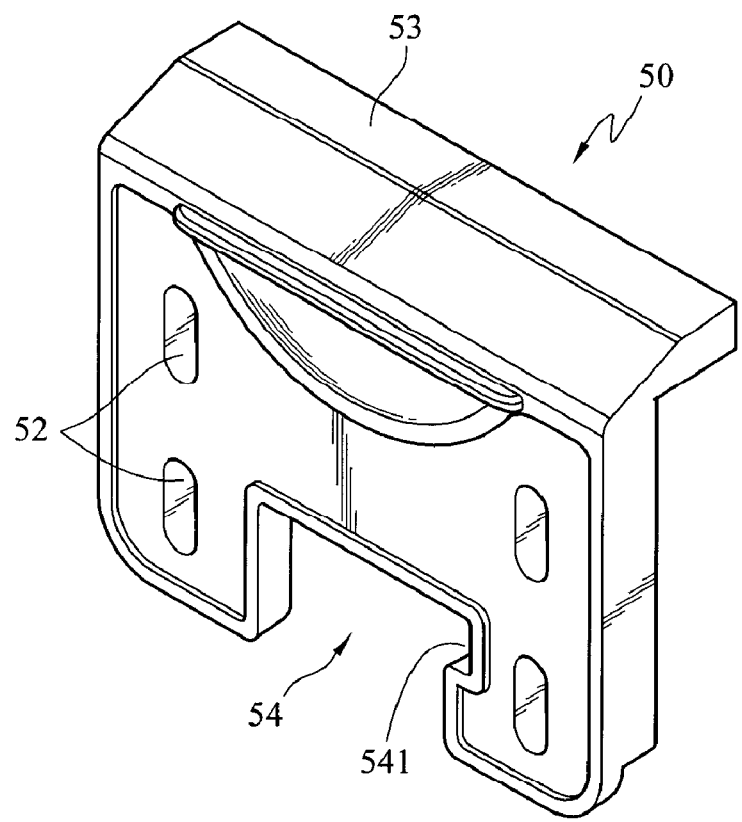
FIG. 5A is a perspective view of a first sliding member according to the first embodiment of the present invention.
Figure 5B:
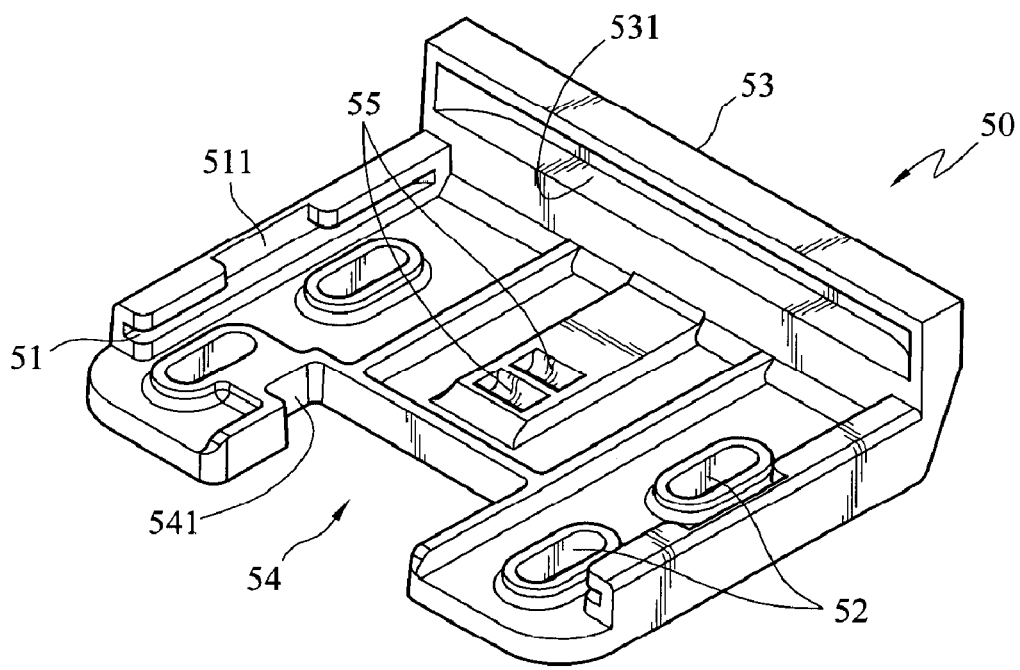
FIG. 5B is a perspective view of a first sliding member according to the first embodiment of the present invention.
Figure 6:
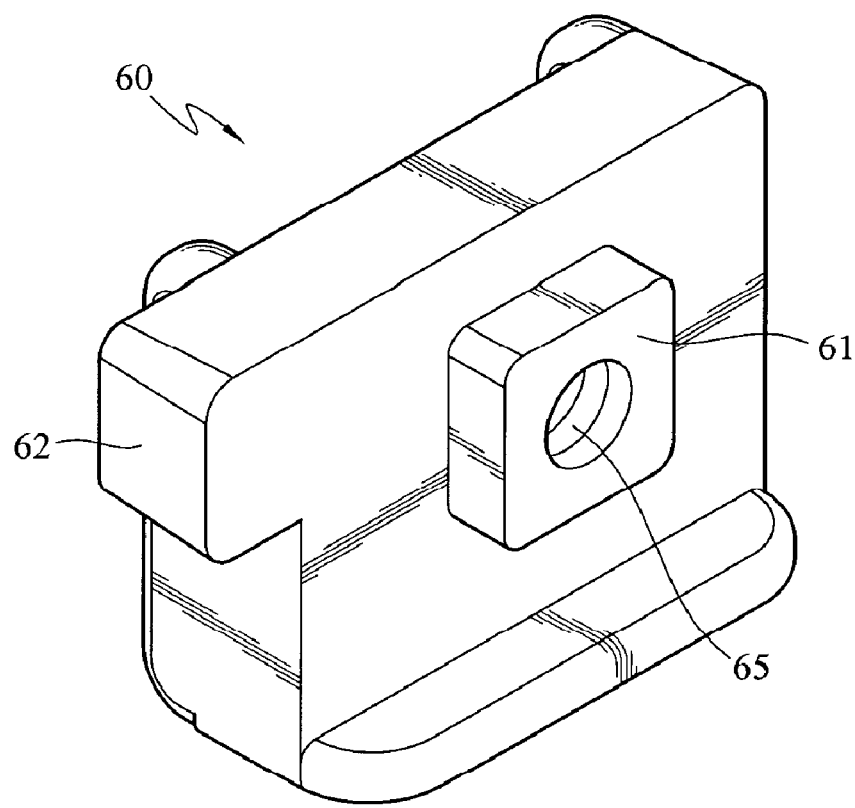
FIG. 6 is a perspective view of a second sliding member according to the first embodiment of the present invention.
Figure 7:
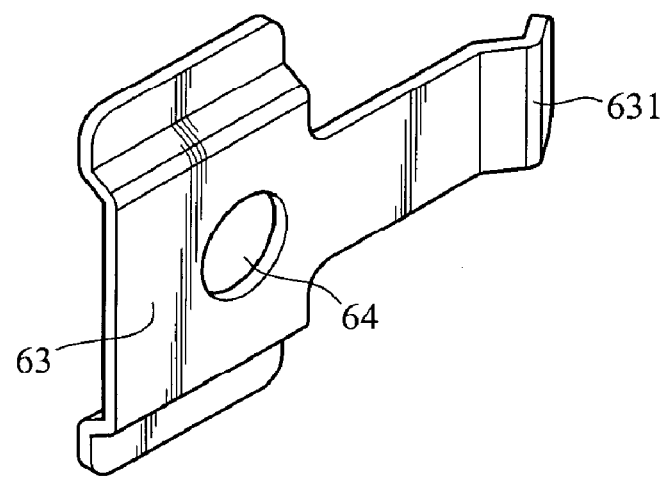
FIG. 7 is a perspective view of a positioning sheet according to the first embodiment of the present invention.

Referring to FIGS. 2, 3, and 4, the fixing member 30 is a plate with an irregular edge and includes a plurality of bolt hole 31, a plurality of lobes 32, a sliding slot 33, a abutting sheet 34, and a cutting slot 35. The bolt holes 31 are formed in the fixing member 30 and communicate two side surface of the fixing member 30, and the positions and number of the bolt holes 31 are corresponding to those of the fixing holes 24 formed in the door 20. Each of the fixing holes 24 is provided for a bolting member 70 to pass through and to be screwed into the corresponding bolt hole 31, so as to fix the fixing member 30 to the inner region surrounded by the U-shaped flange 23 on the door 20. Furthermore, the front end of the bolting member 70 protrudes from one side of the fixing member 30. The lobes 32 are formed at opposite edges of the fixing member 30 and protrude outward from the edge of the fixing member 30, and are disposed symmetrically with respect to a central line of the fixing member 30. The number of the lobes 32 can be changed in consideration of actual designs, and four lobes 32 are preferred in the first embodiment of the present invention. The sliding slot 33 is formed on the fixing member 30 and communicates two side surfaces of the fixing member 30 and is adjacent to one side edge of the fixing member 30. The abutting sheet 34 is formed on the fixing member 30 and is extended from an edge of the cutting slot 35 of the fixing member 30. The abutting sheet 34 is flexible and bent relative to the fixing member 30. In other words, the abutting sheet 34 is a flexible sheet.

Figure 8A:
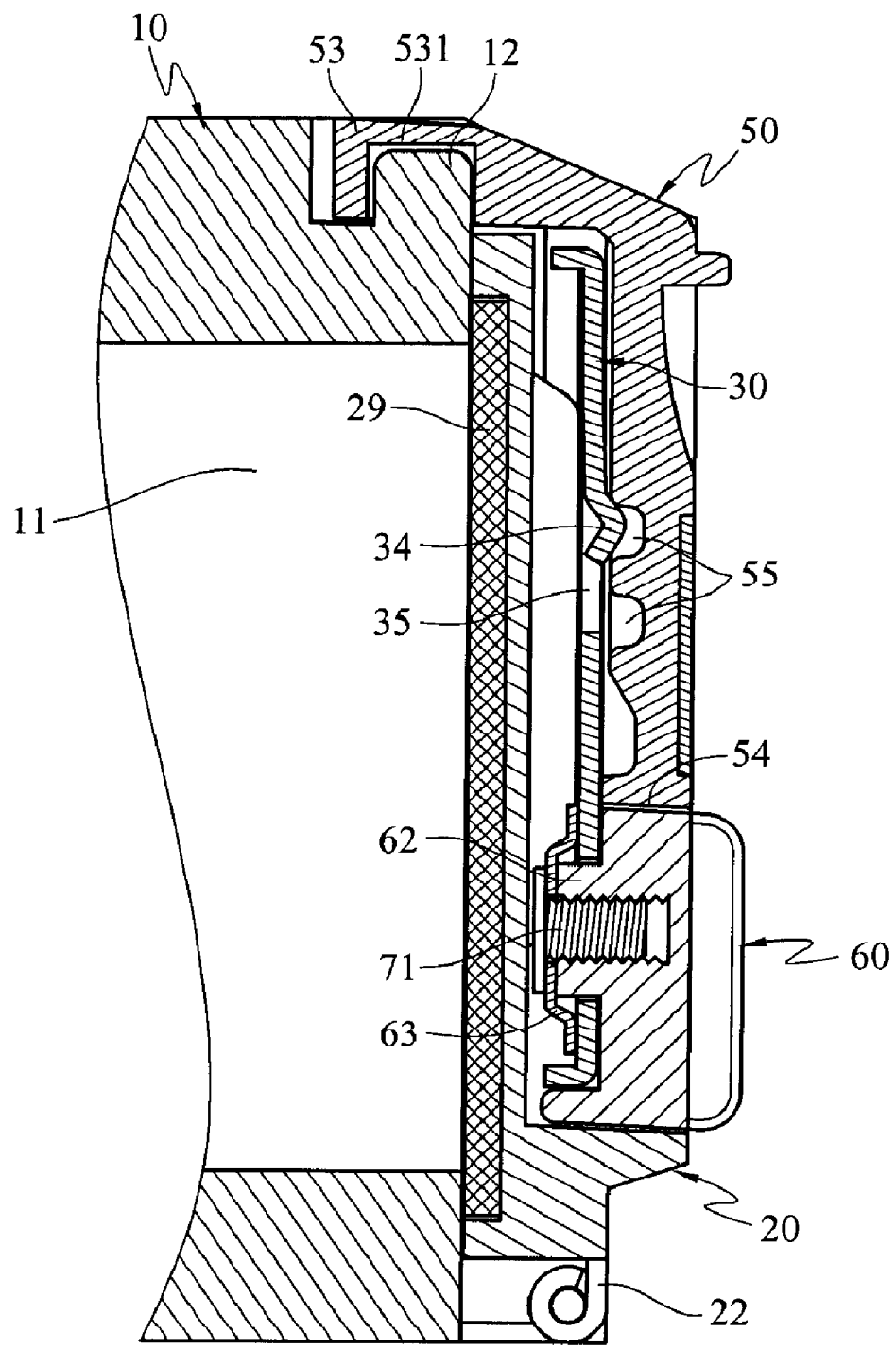
FIG. 8A is a cross-sectional view of a first sliding member at a first position according to the first embodiment of the present invention.

Referring to FIGS. 2, 3, 4, 5A, and 5B, the first sliding member 50 is a plate of a substantially L-shaped section, and is movably disposed on the door 20, wherein the first sliding member 50 slides between a first position (FIG. 8A) and a second position (FIG. 8B) relative to the door 20, i.e., moves in a longitudinal axis direction relative to the door 20.

The first sliding member 50 has two opposite sliding tracks 51, a plurality of limiting holes 52, a latching portion 53, an accommodation slot 54, two positioning holes 55, and a decoration element 56. The sliding tracks 51 are formed symmetrically on two opposite edges of the first sliding member 50, and one end of each of the sliding tracks 51 is closed and a gap 511 is formed at the middle section of each sliding track 51. A pair of the lobes 32 enters the sliding tracks 51 through the gaps 511, and meanwhile the other pair of the lobes slides into the sliding tracks 51 through the other ends of the sliding tracks 51. The sliding track 51 is used to accommodate the lobes 32 of the fixing member 30 to slide therein, such that the first sliding member 50 is movably disposed on the fixing member 30, and is guided by the lobes 32 to slide relative to the fixing member 30. Each of the limiting holes 52 is oblong and is formed in the first sliding member 50 to communicating two side surface of the first sliding member 50. The number and configuration position of the limiting holes 52 are corresponding to those of each bolt hole 31 of the fixing member 30 and each fixing holes 24 of the door 20. The limiting holes 52 are provided for the front end of the bolting member 70 protruding from one side of the fixing member 30 to extend therein, so as to limit the first sliding member 50 to slide between the first position and the second position relative to the door 20 (the fixing member 30), i.e., the first sliding member 50 is guided by the bolting member 70 through the limiting holes 52. The latching portion 53 is formed on the side adjacent to the closed end of the sliding track 51 on the first sliding member 50, and is accommodated into the gap 21 of the door 20. An engaged depression 531 is formed on the latching portion 53 and is engaged with the rib 12 of the housing 10 at the first position to prevent the door 20 from rotating relative to the housing 10. The accommodation slot 54 is formed on the first sliding member 50 and depressed inward from the side adjacent to the opening of the sliding track 51 on the first sliding member 50, and corresponds to the sliding slot 33 of the fixing member 30 and the positioning holes 26 of the door 20. A nick 541 is further formed on one side edge of the accommodation slot 54, such that the accommodation slot 54 communicates with the nick 541. The positioning holes 55 are formed side by side in the central portion of the first sliding member 50 along a longitudinal axis direction are corresponding to the abutting sheet 34 of the fixing member 30. The positioning holes 55 are disposed corresponding to the first position and the second position, such that the abutting sheet 34 is moved together with the first sliding member 50 to coupled the positioning holes 55 at the first position or the second position respectively, so as to retain the first sliding member 50 at the first position or the second position respectively. The decoration element 56 is attached on the outer side surface of the first sliding member 50 to cover the limiting holes 52 and provide the dustproof function and beautiful appearance of the first sliding member 50.

Referring to FIGS. 2, 3, 4, 5A, 5B, 6, and 7, the second sliding member 60 is movably disposed on the sliding slot 33 of the fixing member 30. Since the fixing member is fixed on the door 20, the second sliding member 60 is also movably disposed on the door 20. The second sliding member 60 slides in the accommodation slot 54 of the first sliding member 50 relative to the fixing member 30 (the door 20), so as to enter or withdraw from the nick 541 of the first sliding member 50, i.e., move along a transverse axis direction relative to the door 20. The sliding paths of the second sliding member 60 and the first sliding member 50 are intersected on the same plane. The sliding path (along the transverse axis direction) of the second sliding member 60 may be perpendicular to the sliding path (along the longitudinal axis direction) of the first sliding member 50. When the second sliding member 60 enter the nick 541, the second slides member 60 prevents the first sliding member 50 from departing from the first position, thereby ensuring the door 20 to securely cover and seal the opening 11.

The second sliding member 60 includes a slider 61, a stopper 62, and a positioning sheet 63. The slider 61 has a bolt hole 65 and the positioning sheet 63 has a positioning hole 64 for a bolting member 71 to pass through and to be screwed into the bolt hole 65, so as to mount the positioning sheet 63 on the slider 61. The slider 61 is movably disposed in the sliding slot 33 of the fixing member 30, and is guided by the sliding slot 33 to slide relative to the fixing member 30, so as to limit a sliding travel (i.e., along the transverse axis direction) of the second sliding member 60 for the stopper 62 to enter or withdraw from the nick 541. The stopper 62 is provided for being inserted in the nick 541 of the first sliding member 50, so as to prevent the first sliding member 50 from sliding relative to the door 20. Thus the latching portion 53 of the first sliding member 50 remains being engaged with the rib 12 of the housing 10, and the door 20 securely cover and seal the opening 11 of the housing 10. The positioning sheet 63 further has a flexible and bent abutting leaf 631. The abutting leaf 631 extends from one side of the positioning sheet 63, and is moved together with the second sliding member 60 relative to the positioning sheet 63 for being coupled with the positioning hole 26 on the door 20 at the first position or the second position, so as to retain the second sliding member 60.

Figure 8B:
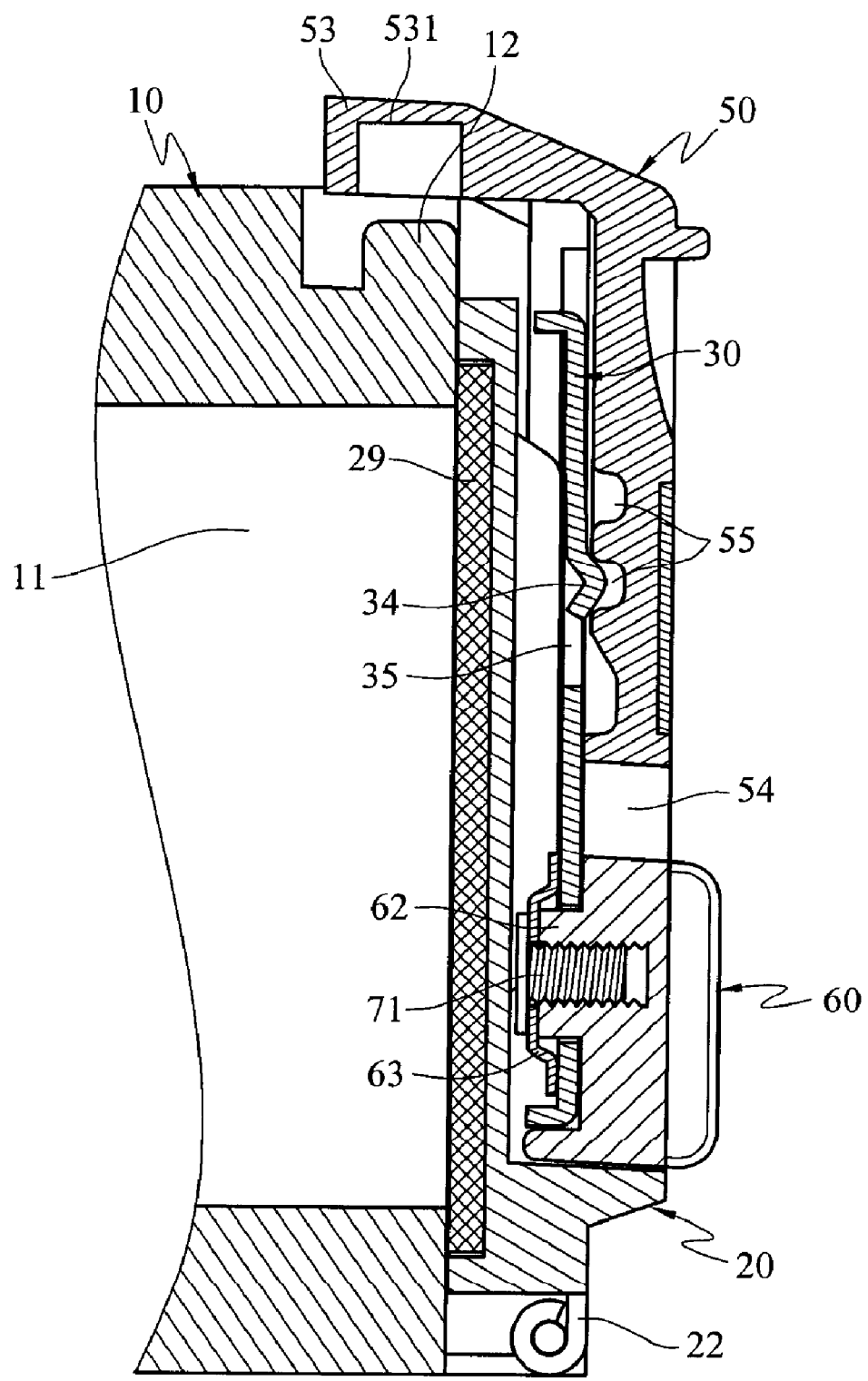
FIG. 8B is a cross-sectional view of the first sliding member at a second position according to the first embodiment of the present invention.

Referring to FIGS. 2, 4, 8A, and FIG. 8B, FIG. 8A is a cross-sectional view of a first sliding member 50 at a first position according to the first embodiment of the present invention, and FIG. 8B is a cross-sectional view of the first sliding member 50 at a second position according to the first embodiment of the present invention.

The fixing member 30 is fixed on the door 20 by the bolting member 70, and the first sliding member 50 is movably disposed on the fixing member 30 through placing lobs 32 of the fixing member 30 is the sliding tracks 51, so as to slide along the longitudinal axis direction relative to the door 20. Each limiting hole 52 of the first sliding member 50 has one of the bolting member 70 disposed therein, such that the first sliding member 50 can slide between the first position in FIG. 8A and the second position in FIG. 8B on the door 20 only, and accordingly the first sliding member 50 may not depart from the door 20. Meanwhile, the latching portion 53 of the first sliding member 50 is engaged with the rib 12 of the housing 10 at the first position, so as to prevent the door 20 from rotating relative to the housing 10, which ensures the door 20 to securely cover and seal the opening of the housing 10 at the first position. Therefore, if the user intends to open the door 20 to expose the opening 11 of the housing 10, he/she must push the first sliding member 50 from the first position to the second position to open the door 20, that is, the first sliding member 50 is a first secure mechanism provided by the lockable door assembly of the first embodiment. When releasing the first secure mechanism (the first sliding member 50), the abutting sheet 34 of the fixing member 30 is coupled with each of the positioning holes 55 of the first sliding member 50 at the first position and the second position and knock each other to make a sound, which indicates that the first sliding member 50 is located at the first position and the second position respectively and is a message of reaching the position.

Figure 9A:
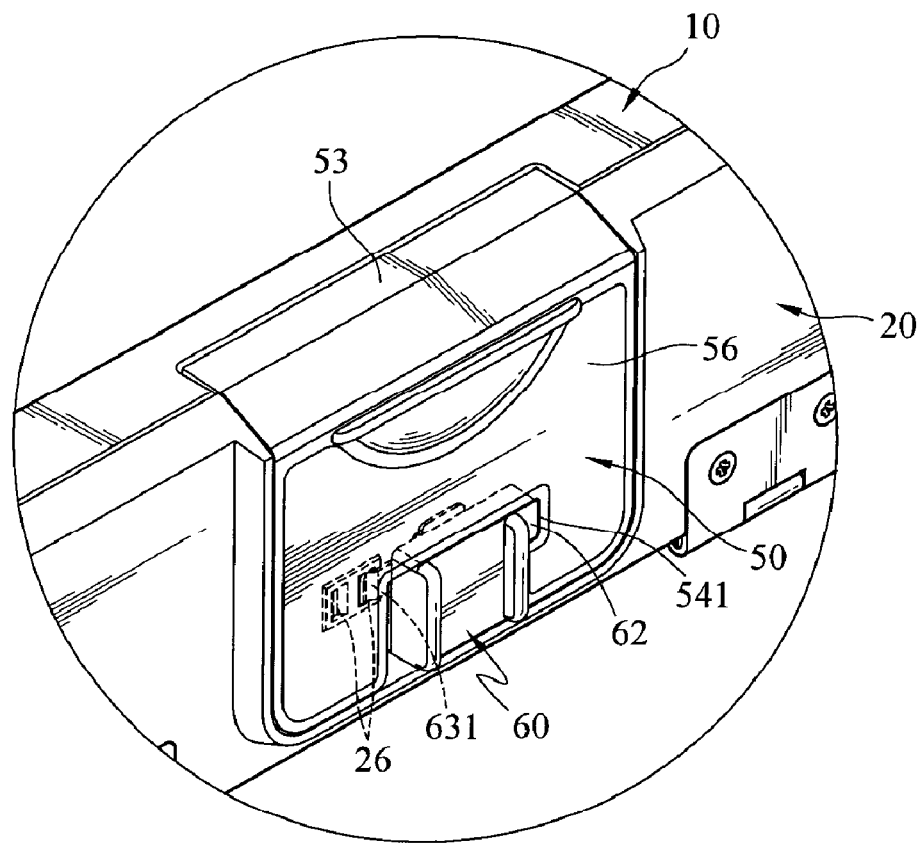
FIG. 9A is a perspective view of a second sliding member inserted into a nick according to the first embodiment of the present invention.
Figure 9B:
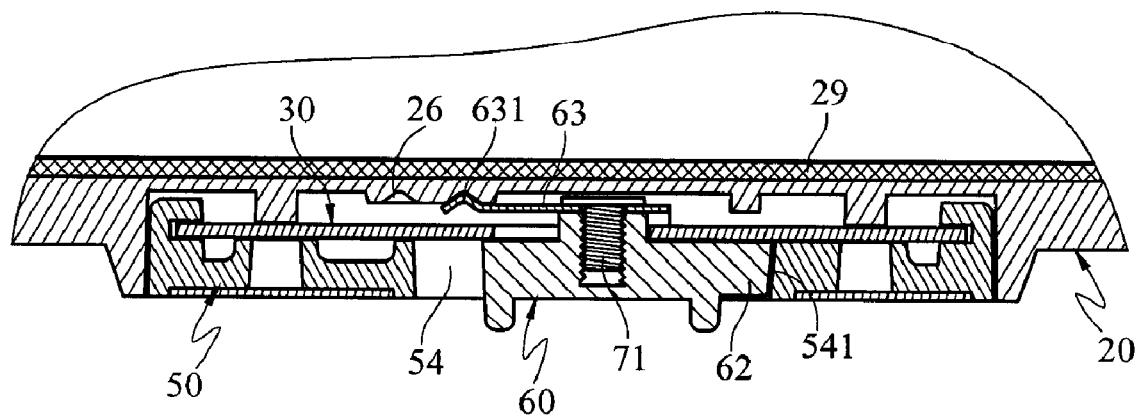
FIG. 9B is a cross-sectional view of the second sliding member inserted into the nick according to the first embodiment of the present invention.
Figure 10A:
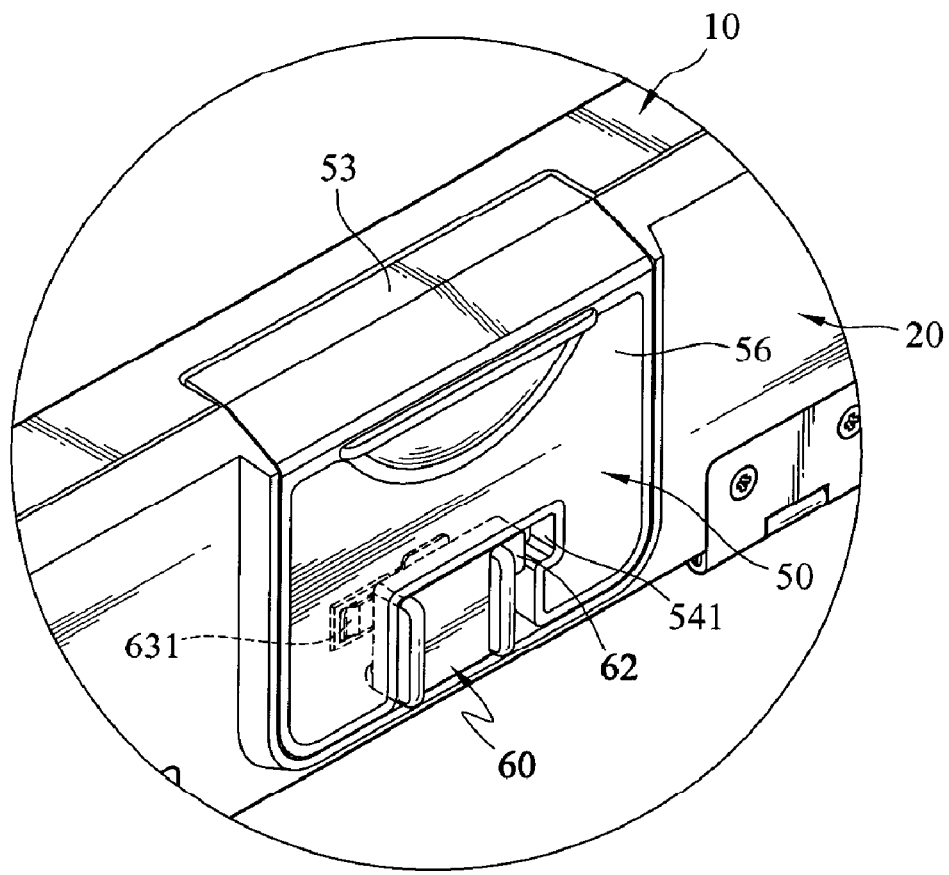
FIG. 10A is a perspective view of the second sliding member withdrawing from the nick according to the first embodiment of the present invention.
Figure 10B:
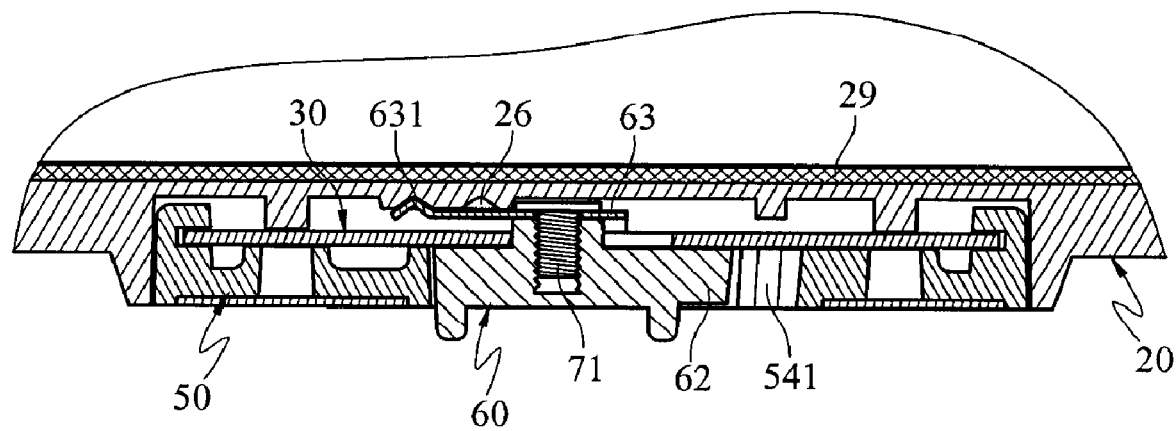
FIG. 10B is a cross-sectional view of the second sliding member withdrawing from the nick according to the first embodiment of the present invention.

Referring to FIGS. 2, 6, 7, 9A, 9B, 10A, and 10B, FIG. 9A is a perspective view of the second sliding member 60 inserted into the nick 541 according to the first embodiment of the present invention, and FIG. 9B is a cross-sectional view of the second sliding member 60 inserted into the nick 541 according to the first embodiment of the present invention. FIG. 10A is a perspective view of the second sliding member 60 withdrawing from the nick 541 according to the first embodiment of the present invention, and FIG. 10B is a cross-sectional view of the second sliding member 60 withdrawing from the nick 541 according to the first embodiment of the present invention.

The second sliding member 60 is movably disposed on the fixing member 30 by disposing the slider 61 in the sliding slot 33, such that the slider 61 of the second sliding member 60 is limited by the sliding slot 33 to slide in the transverse axis direction relative to the door 20 only, so as to be inserted into or withdrawn from the nick 541. The second sliding member 60 is also inserted in the accommodation slot 54 of the first sliding member 50, such that the second sliding member 60 and the first sliding member 50 slides on the same plane, which reduces the thickness of the second sliding member 60 and the first sliding member 50. Meanwhile, the stopper 62 of the second sliding member 60 is inserted in the nick 541 of the first sliding member 50, so as to prevent the first sliding member 50 from departing from the first position. Therefore, if the user intends to push the first sliding member 50 from the first position to the second position, he/she must withdraw the second sliding member 60 from the nick 541 of the first sliding member 50 firstly to further release the first secure mechanism and then open the door 20, that is, the second sliding member 60 is a second secure mechanism provided by the lockable door assembly of the first embodiment. When releasing the second sliding member 60, the abutting leaf 631 of the positioning sheet 63 is coupled with each positioning hole 26 of the door 20 at two end points of the sliding travel while knocking each other to make a sound, which indicates that the second sliding member 60 is located at a third position and a fourth position respectively and is a message of reaching the position.

Figure 11A:
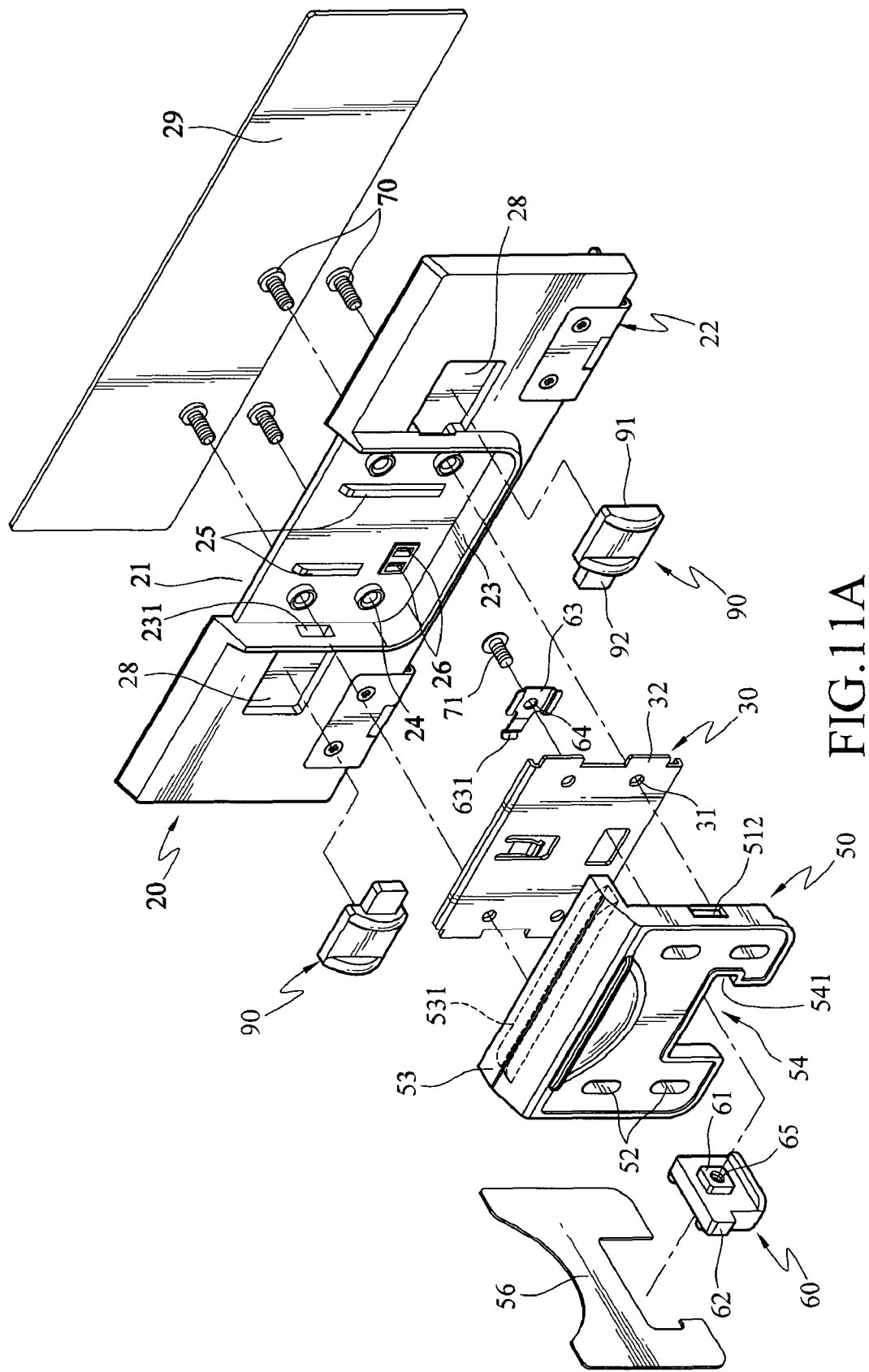
FIG. 11A is an exploded view of a lockable door assembly according to a second embodiment of the present invention.
Figure 11B:
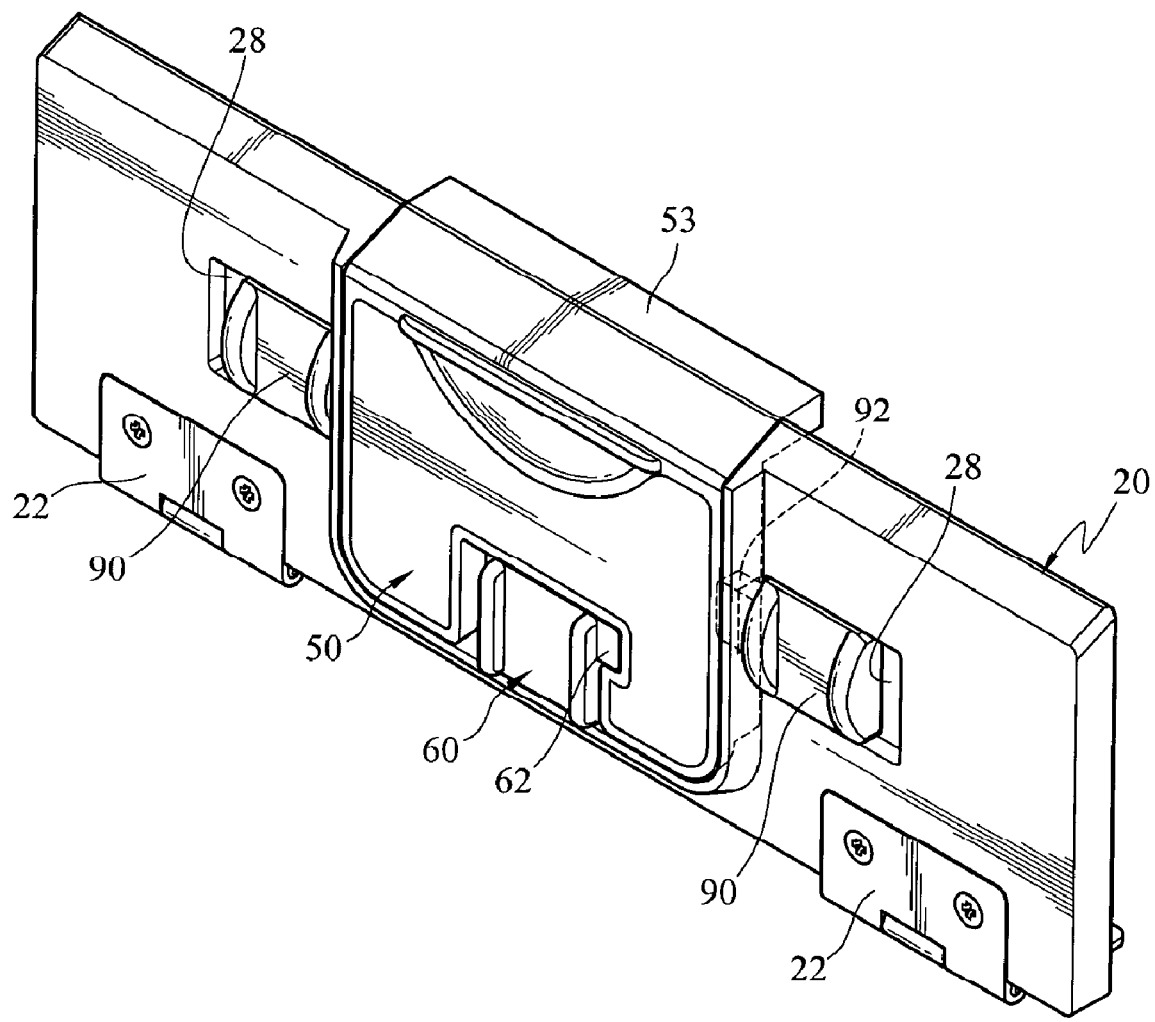
FIG. 11B is a perspective view of the lockable door assembly according to the second embodiment of the present invention.

Referring to FIGS. 11A and 11B, the lockable door assembly according to a second embodiment of the present invention is shown. In the second embodiment, a third secure mechanism and a secure protection mechanism are added based on the architecture of the first embodiment. Definitely, it is also allowed that the third secure mechanism or the fourth secure mechanism is added, or more secure mechanisms are added. However, in the second embodiment, only the third secure mechanism and the fourth secure mechanism are added as an illustration.

Under the implementation architecture based on the first embodiment of the present invention, the second embodiment further includes another two second sliding members 90, which are movable disposed on the door 20 outside the U-shaped flange 23, and slide in the transverse axis direction relative to the door 20 respectively. Two symmetric sliding slots 28 are formed on the door 20 to accommodate the second sliding members 90 to slide on the door 20. Two through holes 231 penetrating through the U-shaped flange 23 are formed on the door 20 respectively, and each of the through holes 231 is communicated with the inner region surrounded by the U-shaped flange 23 through each of the sliding slots 28. A nick 512 is formed on each of the sliding track 51 of the first sliding member 50 respectively, each of the nicks 512 is formed on the bottom wall of the sliding track 51 and corresponds to each of the gaps 511 and communicates the bottom wall of the sliding track 51. Each of the second sliding members 90 has a slider 91 and a stopper 92. Each of the sliders 91 may be inserted into the corresponding sliding slot 28 of the door 20, such that the second sliding members 90 may slide relative to the door 20 and each of the second sliding members 90 has a sliding travel (along the transverse axis direction) for the stopper 92 to enter or withdraw from the nick 512. Each of the stoppers 92 passes through the corresponding through hole 231 to be inserted into the nick 512 of each sliding track 51, so as to prevent the first sliding member 50 from departing from the first position, and make the door 20 to cover and seal the opening of the housing 10 at the first position.

Therefore, if the user intends to move the first sliding member 50 from the first position to the second position (i.e., before releasing the first securen mechanism), each of the second sliding members 90 must be moved firstly to withdraw from the nicks 512 of the first sliding member 50, and then the first secure mechanism may be released to open the door 20. In the second embodiment, the third and fourth secure mechanisms provided by the lockable door assembly may prevent the door 20 from being mistakenly opened if the second secure mechanism is released accidentally.

The lockable door assembly of the present invention has reduced number of parts and a simplified structure, thereby effectively enhancing structure strength and structure durability. The first sliding member 50 and the second sliding member 60 slide on the same plane, thus not only reducing the thickness of the lockable door assembly, but also providing a double secure mechanism that prevents the door 20 from being mistakenly opened respectively, and provides suitable protection for the opening 11 on an electronic device for expansion and replacement. The additional protection mechanisms provided by the second sliding members 90 can further enhance the protection provided by the lockable door assembly to the electronic device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lockable door assembly for covering and sealing an opening of a housing, wherein the housing has a rib formed thereon, the lockable door assembly comprising:

a door pivoted to the housing for covering the opening;

a first sliding member movably disposed on the door and arranged to slide between a first position and a second position on the door, wherein the first sliding member has a latching portion, an accommodation portion, and at least one nick, wherein the nick extends from the accommodation portion, and wherein the latching portion is engaged with the rib when the first sliding member is in the first position thereof, so as to stop the door from rotating relative to the housing;

at least one second sliding member movably disposed on the door, the second sliding member arranged to slide between a first position and a second position located within the accommodation portion when the first sliding member is in the first position thereof, wherein the sliding paths of the second sliding member and the first sliding member are intersected, and wherein the first sliding member and the second sliding member are arranged such that when the second sliding member is in the first position thereof and the first sliding member in the first position thereof, at least a portion of the second sliding member is inserted into the nick to prevent the first sliding member from departing from the first position thereof, and wherein when the second sliding member is in the second position thereof and the first sliding member in the first position thereof, said portion of the second sliding member is removed from the nick but remains within the accommodation portion, and the first sliding member can depart from the first position.

2. The lockable door assembly as claimed in claim 1, further comprising a fixing member fixed on the door, wherein the first sliding member is movable disposed on the fixing member.

3. The lockable door assembly as claimed in claim 2, wherein a plurality of lobes are formed at opposite edges of the fixing member, two opposite sliding tracks are formed on the first sliding member, and the lobes are provided for sliding in the sliding tracks, such that the first sliding member slides relative to the fixing member.

4. The lockable door assembly as claimed in claim 2, wherein the first sliding member further comprises two positioning holes arranged side by side corresponding to the first position and the second position, and a flexible and bent abutting sheet is formed on the fixing member for being moved together with the first sliding member, so as to be coupled with the positioning holes at the first position and the second position.

5. The lockable door assembly as claimed in claim 2, wherein the second sliding member is movably disposed on the fixing member and slides in the accommodation portion relative to the door.

6. The lockable door assembly as claimed in claim 2, wherein a sliding slot is formed on the fixing member, and the second sliding member is guided by the sliding slots to slide relative to the fixing member and the first sliding member.

7. The lockable door assembly as claimed in claim 6, wherein the second sliding member has a slider and a stopper, and the slider is disposed in the sliding slot to guide the stopper to slide and insert into the nick.

8. The lockable door assembly as claimed in claim 7, further comprising two positioning holes arranged side by side formed in the door, and a positioning sheet mounted at the slider and having a flexible and bent abutting leaf for being coupled with each of the positioning holes, so as to retain the second sliding member.

9. The lockable door assembly as claimed in claim 1, further comprising three second sliding members, wherein three nicks corresponding to the second sliding members are formed on the first sliding member, each of the second sliding members slides into each of the nicks, so as to prevent the first sliding member departing from the first position.

10. The lockable door assembly as claimed in claim 1, wherein an engaged depression is formed on the latching portion, and is engaged with the rib at the first position.

11. An electronic device with a lockable door assembly, comprising:
   a housing having an opening, wherein a rib is formed on the housing;
   a door pivoted to the housing for covering the opening;
   a fixing member fixed on the door;
   a first sliding member movably disposed on the fixing member and arranged to slide between a first position and a second position relative to the door, wherein the first sliding member has a latching portion, an accommodation portion, and at least one nick, wherein the nick extends from the accommodation portion, and wherein the latching portion is engaged with the rib when the first sliding member is in the first position thereof, so as to stop the door from rotating relative to the housing; and
   at least one the second sliding member movably disposed on the door, the second sliding member arranged to slide between a first position and a second position located within the accommodation portion when the first sliding member is in the first position thereof, wherein the sliding paths of the second sliding member and the first sliding member are intersected, and wherein the first sliding member and the second sliding member are arranged such that when the second sliding member is in the first position thereof and the first sliding member in the first position thereof, at least a portion of the second sliding member is inserted into the nick to prevent the first sliding member from departing from the first position thereof, and wherein when the second sliding member is in the second position thereof and the first sliding member in the first position thereof, said portion of the second sliding member is removed from the nick but remains within the accommodation portion, and the first sliding member can depart from the first position.

12. The electronic device with a lockable door assembly as claimed in claim 11, wherein a plurality of lobes is formed on opposite edges are formed on the first sliding member, and the lobes are provided for sliding in the sliding track, such that the first sliding member slides relative to the fixing member.

13. The electronic device with a lockable door assembly as claimed in claim 11, wherein a plurality of fixing holes are formed in the door, a plurality of bolt holes corresponding to the fixing holes are formed in the fixing member, and each of the fixing holes is provided for a bolting member to pass through and to be screwed in the corresponding bolt hole, so as to fix the fixing member onto the door.

14. The electronic device with a lockable door assembly as claimed in claim 11, wherein the second sliding member slides in the accommodation portion relative to the door.

15. The electronic device with a lockable door assembly as claimed in claim 11, wherein a sliding slot is formed on the fixing member, and the second sliding member is guided by the sliding slot to slide relative to the fixing member and the first sliding member.

16. The electronic device with a lockable door assembly as claimed in claim 15, wherein the second sliding member has a slider and a stopper, and the slider is movably disposed in the sliding slot to guide the stopper to slide and insert into the nick.

17. The electronic device with a lockable door assembly as claimed in claim 16, further comprising two positioning holes arranged side by side are formed in the door, and a positioning sheet mounted at the slider and having a flexible and bent abutting leaf for being coupled with each of the positioning holes, so as to retain the second sliding member.

18. The electronic device with a lockable door assembly as claimed in claim 11, further comprising three second sliding members, wherein three nicks corresponding to the second sliding members are formed on the first sliding member, each of the second sliding members slides into each of the nicks respectively, so as to prevent the first sliding member departing from the first position.

19. The electronic device with a lockable door assembly as claimed in claim 11, wherein an engaged depression is formed on the latching portion, and is engaged with rib at the first position.

* * * * *